US008886935B2

(12) United States Patent
Ohba et al.

(10) Patent No.: US 8,886,935 B2
(45) Date of Patent: Nov. 11, 2014

(54) KEY MANAGEMENT DEVICE, SYSTEM AND METHOD HAVING A REKEY MECHANISM

(75) Inventors: Yoshihiro Ohba, Tokyo (JP); Mitsuru Kanda, Tokyo (JP); Subir Das, Piscataway, NJ (US); David Famolari, Piscataway, NJ (US)

(73) Assignees: Kabushiki Kaisha Toshiba, Tokyo (JP); Telcordia Technologies Inc., Piscataway, NJ (US)

( * ) Notice: Subject to any disclaimer, the term of this patent is extended or adjusted under 35 U.S.C. 154(b) by 51 days.

(21) Appl. No.: 13/069,989

(22) Filed: Mar. 23, 2011

(65) Prior Publication Data

US 2011/0271110 A1 Nov. 3, 2011

Related U.S. Application Data

(60) Provisional application No. 61/329,916, filed on Apr. 30, 2010.

(51) Int. Cl.
*H04L 9/32* (2006.01)

(52) U.S. Cl.
USPC .............................. 713/168; 380/47; 380/277

(58) Field of Classification Search
USPC ................. 713/168, 169, 193, 513, 170, 194; 711/163; 726/10; 709/223; 380/47
See application file for complete search history.

(56) References Cited

U.S. PATENT DOCUMENTS

| 8,239,681 B2 * | 8/2012 | Ishibashi | 713/169 |
|---|---|---|---|
| 2003/0140241 A1 * | 7/2003 | England et al. | 713/194 |
| 2006/0171534 A1 * | 8/2006 | Baughman | 380/47 |
| 2007/0127719 A1 * | 6/2007 | Selander et al. | 380/277 |
| 2008/0101611 A1 | 5/2008 | Lindholm et al. | |
| 2008/0181399 A1 * | 7/2008 | Weise et al. | 380/44 |
| 2008/0219186 A1 | 9/2008 | Bell et al. | |
| 2010/0037069 A1 * | 2/2010 | Deierling et al. | 380/44 |
| 2010/0211787 A1 * | 8/2010 | Bukshpun et al. | 713/170 |
| 2012/0036245 A1 * | 2/2012 | Dare et al. | 709/223 |
| 2012/0042172 A1 * | 2/2012 | Milgramm | 713/186 |
| 2012/0191975 A1 * | 7/2012 | Asnaashari et al. | 713/168 |
| 2012/0206108 A1 * | 8/2012 | Waring | 320/137 |
| 2012/0294440 A1 * | 11/2012 | Little et al. | 380/44 |

FOREIGN PATENT DOCUMENTS

| JP | 11-296076 A | 10/1999 |
|---|---|---|
| JP | 2010-503258 A | 1/2010 |
| WO | 00/38392 A2 | 6/2000 |
| WO | 2009/107442 A1 | 9/2009 |

OTHER PUBLICATIONS

International Search Report of PCT/US2011/034794, date of mailing Jul. 26, 2011.
Written Opinion of The International Search Authority dated Jul. 26, 2011, issued in International Application No. PCT/US2011/034794.
Japanese Office Action dated Jan. 7, 2014, issued in corresponding Japanese application No. 2013-508086, w/English translation (6 pages).

* cited by examiner

*Primary Examiner* — Dustin Nguyen
(74) *Attorney, Agent, or Firm* — Westerman, Hattori, Daniels & Adrian, LLP

(57) ABSTRACT

According to some embodiments, a key management apparatus for deploying in a smart grid system adapted to receive metering data from smart meters connected to at least one relay via a network, includes: a key control mechanism that derives a key array of individual purpose specific keys from one master key such that the purpose specific key in the key array are each independent cryptographic keys for each specific usage in an application or for each application if there is only one specific usage in an application.

14 Claims, 11 Drawing Sheets

Fi.3

KEY MANAGEMENT DEVICE, SYSTEM AND METHOD HAVING A REKEY MECHANISM

CROSS-REFERENCE TO RELATED APPLICATION

This application claims the benefit of U.S. Provisional Application No. 61/329,916, filed Apr. 30, 2010, the entire disclosure of which is incorporated herein by reference.

BACKGROUND

1. Field

Preferred embodiments described herein relate generally to Smart grid communications and to other communications. In particular, to a key management mechanism that does not depend on the frequency of re-key of a cryptographic key of each application using the same master session key.

2. Background Discussion

Efficient use and management of energy resources are becoming more and more important in today's world. Many nations are giving importance to power grid modernization by adding the capabilities to the system using state-of-art communication and information technologies. This transformation is taking place under the umbrella of Smart Grid initiatives whereby power grid is adding advanced features such as monitor, analysis, control and two-way communication capabilities. The goal is to save energy, reduce cost and increase reliability and transparency. While many of these features and capabilities exist today, they exist in isolation and are controlled by individual ESP. The goal of the Smart Grid is to create an infrastructure with the advanced features noted above to maximize the throughput of the grid system through efficient use of energy resources.

The Smart Grid Interoperability project and the Institute of Electrical and Electronics Engineers Standard bodies have realized that the best way to achieve the goal is to create a communication network consisting of multiple different technologies and layers. This communication network will span from wide area networks (WANs) to customer premise networks such as, home area networks (HANs) or Business area networks (BANS). For example, Advanced Metering, Home Appliances can be connected to either HAN or BAN and then can make use of WAN to transmit the information to the ESP. This system has potential to turn into an information super highway similar to today's Internet which could potentially enable all stakeholders in the community to interact, monitor and manage the system much more efficiently than what is available to them today.

While Electric Service Providers (ESPs) are excited about the capabilities of communication and information technologies, they are also concerned about the fact that there may not be any physical boundary by which the components of the power grid are connected. For example, unlike traditional grid, advanced metering system may be connected to the ESP via Internet or via wireless networks that are susceptible to attacks and vulnerable to eavesdropping or spoofing, which can eventually damage safety and reliability of the grid. Therefore communication and information security are becoming one of the major requirements for adopting such technologies. Thus, it is absolutely necessary to protect the networks in order to provide the guarantee that the information carried on it is safe and secure.

Although a vast majority of the security technologies are available today to address the communication network security, the smart grid environment is different thereby also making requirements different. For example, an electric or gas meter in the advanced metering system or a smart meter is a low processing power device with personal area wireless network technology such as, Zigbee (see background reference 8). These devices are usually considered as low-cost wireless devices typically with 4-12K of RAM and 64-256K of flash memory. Often these devices may be connected to the backhaul with low bandwidth links. The link characteristics can also vary depending upon the wireless radio features such as sleeping or idle mode of operation. For example, the advanced metering system may wake up periodically to sync with the network in order to save power rather than remaining active all the time. Additional requirements for device may include: i) supporting multi-hop networks using mesh topology (e.g., to extend the backhaul reach back); ii) supporting multiple link layer technologies. These requirements demand that the protocol overhead and performance must be optimized.

Advanced meters can also be used for other purposes besides simple metering data. ANSI C12.22, as disclosed in background reference 1, allows using advanced meters peering via relay or concentrators. Other application such as, COAP, as disclosed in background reference 5, may be able to run simultaneously on a single meter. While these are very attractive features and make the advanced meter economically more viable, they add additional requirements to security such as, each application needs to be authenticated and needs to preserve the integrity of the data to the system (e.g., billing system).

Key management has been an area of considerable attention, particularly in browser-based web applications. Most notably, initiatives such as OAuth (mentioned in background reference 11), OpenID (mentioned in background reference 12), SAML (mentioned in background reference 13), and others have emerged to provide single sign-on (SSO) capabilities. OAuth is popular SSO enabler. It provides mechanisms for end users to authorize third-party access to networked resources without requiring that static credentials be shared with the third-party. OAuth accomplishes this through user-agent redirections and temporally issued keys shared with the third-party. Another popular SSO technology is OpenID has gained considerable momentum with commercial web services and is employed several prominent web service providers such as Google, Yahoo!, AOL and facebook among others. OpenID is an open, decentralized access control mechanism that allows users to sign-on to several different services with a single digital identity. OpenID requires regular logon to the subscriber's service provider to access services provided by each service provider. There are also security concerns regarding vulnerabilities associated with OpenID that are just beginning to surface.

For example, in background reference 14, authors address perceived limitations such as symmetric cryptography, length of time authentication status is stored in relay providers and OpenID providers and vulnerabilities to Man-in-the-middle type attacks. Secure Assertion Markup Language (SAML) is technique to provide authentication and authorization data between secure domains such as enterprise networks. SAML is defined in XML and uses federated identity management techniques to ease authentication and authorization tasks across domains under the same federation. In background reference 15, authors identify several security flaws with respect to confidentiality, bilateral authentication, integrity and user tracking that could lead to vulnerable implementations of SAML.

However, OAuth, OpenID and SAML do not address fully unified key management which requires cross-layer key management. Some techniques have tackled the lack of network access authentication within Kerberos by attempting to integrate with EAP as described in background references 16 and 17. However, these techniques require modified EAP methods in order to interwork with Kerberos.

Also, communication protocols such as EAP (Extensible Authentication Protocol), PANA (Protocol for carrying Authentication for Network Access), and ANSI C12.22 (Protocol Specification For Interfacing to Data Communication Networks) are known.

For example, ANSI C12.22 is a meter application protocol in Smart Grid communication. ANSI C12.22 uses EAX'. EAX' is a block cipher algorithm that is a combination of EAX and 128-bit AES, and provides data encryption using a symmetric cryptographic key (or ciphering key) to provide application layer ciphering. ANSI C12.22 allows two or more encryption keys to be used for the same peer, and chooses one ciphering key among those at the time of a session start.

However, the strength of a key being used is weakened as the amount of data enciphered using the same ciphering key increases, since ANSI C12.22 does not define a mechanism for dynamic re-key of the ciphering key of EAX'. Accordingly, it is necessary to provide a re-key mechanism for ANSI C12.22 ciphering keys.

A method that uses EAP is indicated in the PCT application JP2009_69982 filed on November 2010 by Oba, Y titled "Terminal for transmitting encrypted information" (background reference 2). This method is directed to generating a ciphering key of ANSI C12.22 from one EMSK (Extended Master Key) generated by EAP authentication. When re-key of C12.22 is required, it performs EAP re-authentication to generate a new ciphering key of ANSI C12.22 from newly generated EMSK.

As an enhancement of a re-key method defined in the PCT application JP2009_69982 above, a use case is considered in which two or more application ciphering keys are generated from the same EMSK.

Since EAP re-authentication will need to take place to re-key an EMSK when renewal of any descendant key of the EMSK is needed, renewal of ciphering keys of all applications using the same EMSK will take place.

Although the re-key frequency of a ciphering key generally depends on the characteristics of each application, if re-key of a ciphering key of an application requiring a higher re-key frequency takes place, it will lead to unnecessary re-key of ciphering keys of other applications not requiring such a high re-key frequency.

In order to solve this problem, a key management mechanism is needed in which the frequency of EAP re-authentication does not depend on the frequency of re-key of a ciphering key of each application using the same EMSK.

3. Background References

The following background references are incorporated herein by reference in their entireties:
1. American National Standard. Protocol Specification For Interfacing to Data Communication Networks. ANSI C12.22-2008. 2008 (hereinafter referred to as [1]).
2. Oba, Y, Terminal for transmitting encrypted information, JP2009_69982, November, 2010, PCT application (hereinafter referred to as [2]).
3. Salowey J., Specification for the Derivation of Root Keys from an Extended Master Session Key (EMSK). (hereinafter referred to as [3]).
4. Aboba B., Extensible Authentication Protocol (RAP), (hereinafter referred to as [4]).
5. Shelby Z., CoAP Requirements and Features. (hereinafter referred to as [5]).
6. Forsberg D., Protocol for Carrying Authentication for Network Access (PANA) (hereinafter referred to as [6]).
7. Smart Grid Interoperability Standards Project (hereinafter referred to as [7]).
8. ZigBee Alliance. ZigBee Specification. ZigBee Document 053474r18. 2009 6 (hereinafter referred to as [8]).
9. A Patrick, J. Newbury, and S. Gargan, Two-way communications systems in the electricity supply industry, IEEE Transactions on Power Delivery, 13:53-58, January, 1998 (hereinafter referred to as [9])
10. Smart Power Directorate (hereinafter referred to as [10]).
11. Hammer-Lahav E. The OAuth 1.0 Protocol. 2010 (hereinafter referred to as [11]).
12. OpenID Authentication 2.0—Final Technical Specification (hereinafter referred to as [12]).
13. Dynamic Security Assertion Markup Language: Simplifying Single Sign-On. Harding P., Johansson L., Klingenstein N.: IEEE Security 86 Privacy, 2008. 8 (hereinafter referred to as [13]).
14. OhHyun-Kyung, JinSeung-Hun, The Security Limitations of SSO in OpenID.: ICACT 2008 (hereinafter referred to as [14]).
15. Security analysis of the SAML single sign-on browser/ artifact profile. Gross T.: Computer Security Applications Conference 2003 (hereinafter referred to as [15]).
16. Ohba Y., Das S., Dutta A., Kerberized handover keying: a media-independent handover key management architecture.: ACM MobiArch 2007 (hereinafter referred to as [16]).
17. A Kerberized Architecture for Fast Re-authentication in Heterogeneous Wireless Networks. Lopez R., Garcia F., Ohba Y.: Mobile Networks and Applications, 2010 (hereinafter referred to as [17]).
18. Aboba B., Simon D., Eronen P. Extensible Authentication Protocol (EAP) Key Management Framework. 2008 8 (hereinafter referred to as [18]).
19. Kaufman C. Internet Key Exchange (IKEv2) Protocol. 2005 5 (hereinafter referred to as [19]).
20. Vogt C. A Solution Space Analysis for First-Hop IP Source Address Validation. 2009 January (hereinafter referred to as [20]).
21. Ohba Y., Yegin A., Definition of Master Key between PANA Client and Enforcement Point, 2009 (hereinafter referred to as [21]).
22. ZigBee Alliance. ZigBee Smart Energy Profile™ 2.0 Technical Requirements Document. 2010 (hereinafter referred to as [22]).
23. Narayanan V., Dondeti L. EAP Extensions for EAP Re-authentication Protocol (ERP). 2008 August (hereinafter referred to as [23]).

BRIEF DESCRIPTION OF THE DRAWINGS

The above and other features and advantages of embodiments of the present invention will become more apparent by describing in detail exemplary embodiments thereof with reference to the attached drawings in which.

DETAILED DESCRIPTION

Figure 1:
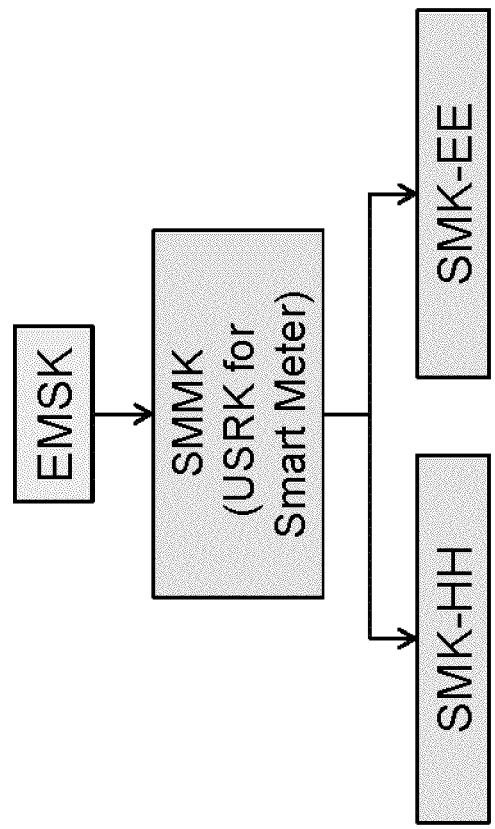
FIG. 1 is a diagram showing a Key Hierarchy of embodiment.

While the present invention may be embodied in many different forms, a number of illustrative embodiments are described herein with the understanding that the present disclosure is to be considered as providing examples of the principles of the invention and that such examples are not intended to limit the invention to preferred embodiments described herein and/or illustrated herein.

Introduction

The preferred embodiments of the present invention overcome various deficiencies found in the existing art.

According to some embodiments, a rekey method is provided for, by way of example, a smart meter, the method including: providing a key control mechanism that derives a key array of individual purpose specific keys from one master key so that the purpose specific key in the key array being each of independent cryptographic keys, for every applications or different uses in the application. In some examples, the method includes that said key control mechanism derives an application master key from one master key for every application, and derives the key array from the application master key. In some examples, the method includes that only one purpose specific key in the key array is effective at same time, and when an effective purpose specific key need to rekey, the key control mechanism stores an array index value corresponding to the effective purpose specific key as used and uses one of unused purpose specific key from the key array as new effective purpose specific key. In some examples, the key control mechanism uses purpose specific key that has an index value being equal to the stored array index value plus one (1) as new effective purpose specific key. In some examples, said key control mechanism sets an array size of the key array to a value proportional to frequency of updating the purpose key. In some examples, the key control mechanism determines an array size of the key array by negotiating using a control message of the application used the purpose specific key. In some examples, the key control mechanism determines an array size of the key array by negotiating using EAP, EAP authentication method, or EAP transport protocol. In some examples, the key control mechanism uses PANA as the EAP transport protocol. In some examples, the master key is EMSK. In some examples, a parameter of key deriving factor includes an array index value corresponding to the purpose specific key of the key array. In some examples, each of application messages includes an array index value corresponding to the purpose specific key used with encryption. In some embodiments, the key control mechanism informs rekey of an opposite entity, when an effective purpose specific key need to rekey, by an application massage including an array index value of a new effective purpose specific key. In some embodiments, the key control mechanism uses ANSI C12.22 as the application. In some embodiments, the key control mechanism informs rekey of an opposite entity, when an effective purpose specific key need to rekey, by a control massage including an array index value of a new effective purpose specific key. In some embodiments, the key control mechanism uses COAP as the application.

According to some other embodiments of the invention, a smart meter is provided that includes: a key control mechanism that derives a key array of individual purpose specific keys from one master key so that the purpose specific key in the key array being each of independent cryptographic keys, for every applications or different uses in the application.

According to some other embodiments of the invention, a communication network system is provided that includes: a unified key management mechanism that generates ciphering keys for multiple protocols of multiple communication layers from a single peer entity authentication attempt, such as to avoid multi-layer authentication via a simple unified key management framework in a manner adaptable to multi-layer and multi-protocol environment. In some examples, the system further includes a key management framework that supports bootstrapping ciphering of multiple protocols. In some examples, the system is a smart grid system.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

Detailed Discussion:

In the preferred embodiments, two or more purpose-specific keys that are used for the same purpose and are cryptographically independent of each other are derived from one EMSK as a means to solve these problems. Here, a purpose-specific key is a ciphering key of an application and can be defined for each specific usage in an application or for each application if there is only one specific usage in an application. An array of two or more purpose-specific keys of the same usage is called a purpose-specific key array. The same purpose-specific key array may be used to protect data of the specific usage in both directions of communication, or a distinct purpose-specific key array may be used in each direction. A generated purpose-specific key will be used for ciphering of application protocol messages defined for the corresponding usage, if the application protocol itself has a ciphering mechanism.

If the application protocol itself does not have a ciphering mechanism but the transport protocol of the application protocol has a ciphering mechanism, the generated purpose-specific key will be used for ciphering the transport protocol message carrying messages of the application protocol. A purpose-specific key array is derived from an application master key (APMK) generated for every application.

An APMK is defined as a USRK (Usage Specific Root Key) derived from EMSK using the key derivation algorithm defined in [3]. APMK=KDF (EMSK, key label|"Y0"| optional data|length)—here, for example, applicationl@ietf.org is the character string by which key label specifies the application bound to the APMK.

The optional data parameter is NULL (0x00) and length is the key length in octets where the length is dependent on application. For the definition of KDF (Key Derivation Function), reference is made to [3]. PK[i], the i-th array element of a purpose-specific key array PK, is derived from APMK as follows.

PK [i]=KDF (APMK, key label|"YO"| optional data|length)—here, key label is the character string which identifies the use in application uniquely, for example, Application1_FunctionX@ietf.org is used; "i" is included in optional data at least. In addition, other information may be included in optional data.

When a purpose-specific key array is dedicated to one particular direction of communication, the information about the direction where a key is used may also be included. The length parameter is the key length in octets and is dependent on the usage. For the definition of KDF (Key Derivation Function), reference is made to [3]. The sizes of a purpose-specific key array may differ for every application and every usage of an application. At this time, the size of a purpose-specific key array may be decided in proportion to the frequency of re-key of a purpose-specific key in the array.

Moreover, the size of a purpose-specific key array may be dynamically determined based on negotiation between peering entities of an application by using a control message of the application.

Moreover, the size of a purpose-specific key array may be dynamically determined based on negotiation by means of EAP, an EAP authentication method, or EAP transport protocol such as PANA [6] at the time of EAP re-authentication.

Each application updates a purpose-specific key by specifying which key array element needs re-key. There are some methods as the method of specification of a key array element. A primary method is to include in each message the key array index corresponding to the key used for ciphering the message. For example, in ANSI C12.22, <key-id> is equivalent to a key array index.

A second method is to exchange the key array index using a control message of the application. By enciphering a control message using the purpose-specific key of that index, this control message can be used to perform re-key safely. An index that has been already used in the past in the same purpose-specific key array will not be used at the time of re-key. Moreover, when the message enciphered with the purpose-specific key of an index present in use and a different index is received, if the received index is one of those used before, re-key will not be performed.

In order to realize this, there is a method of holding a list of indexes used in the past for every purpose-specific key array and holding the effective index or the index that is currently in use, where the value of the effective index will be increased by one every time re-key of a purpose-specific key of the key array is performed. When an index intact does not exist at the time of re-key of a purpose-specific key, EAP re-authentication is carried out, which will lead to re-key all purpose-specific keys for all applications using the same EMSK.

Illustrative Embodiments

An illustrative example of a key hierarchy for ANSI C12.22 is shown in FIG. 1. Here, ANSI C12.22 application describes two usages; registration service and resolve service. Here, the APMK key for ANSI C12.22 is called SMMK (Smart Meter Master Key). For example, smmk@ietf.org is used as Key label. SMMK (Smart Meter Master Key)=KDF (EMSK, smmk@ietf.org|"YO"| optional data|length):
    optional data=NULL (0x00)
    length=64

SMK-HH is the purpose-specific key array is used with resolve service, and SMK-EE is the purpose-specific key array used with registration service.

Each array element of purpose-specific key array SMK-HH is used in order to encipher a resolve request message and a resolve response message between a C12.22 server (e.g., a smart meter) and C12.22 Relay which the C12.22 server connects. The key label parameter used for each array element of purpose-specific key array SMK-HH is "SMK-SM-CTR", the optional data parameter is for example, ANSI C12.21 Relay Ap-Title|ANSI C12.21 key-id, and the length parameter is 16. SMK-SM-CTR (Smart Meter Key between Smarter Meter and Concentrator)=KDF(SMMK, "SMK-SM-CTR"|"YO"| optional data|length):
    optional data: ANSI C12.21 Relay Ap-Title|ANSI C12.21 key-id
    length=16

Each array element of purpose-specific key array SMK-HH is used in order that C12.22 server may encipher a registration request message and a registration response message between the C12.22 server and a C12.22 master relay.

The key label parameter used for each array element of purpose-specific key array SMK-EE is "SMK-SM-MDMS", the optional data parameter is for example, ANSI C12.21 Client Ap-Title|ANSI C12.21 key-id, and length is 16. Operator "|" means the operation which concatenates front data and next data in this order here.

SMK-SM-MDMS (Smart Meter Key between Smarter Meter and MDMS)=KDF(SMMK, "SMK-SM-MDMS"|"YO"| optional data|length)
    optional data: ANSI C12.21 Client Ap-Title|ANSI C12.21 key-id
    length=16

In this document, the word "encryption" encompasses "encryption and an integrity protection."

Figure 2:
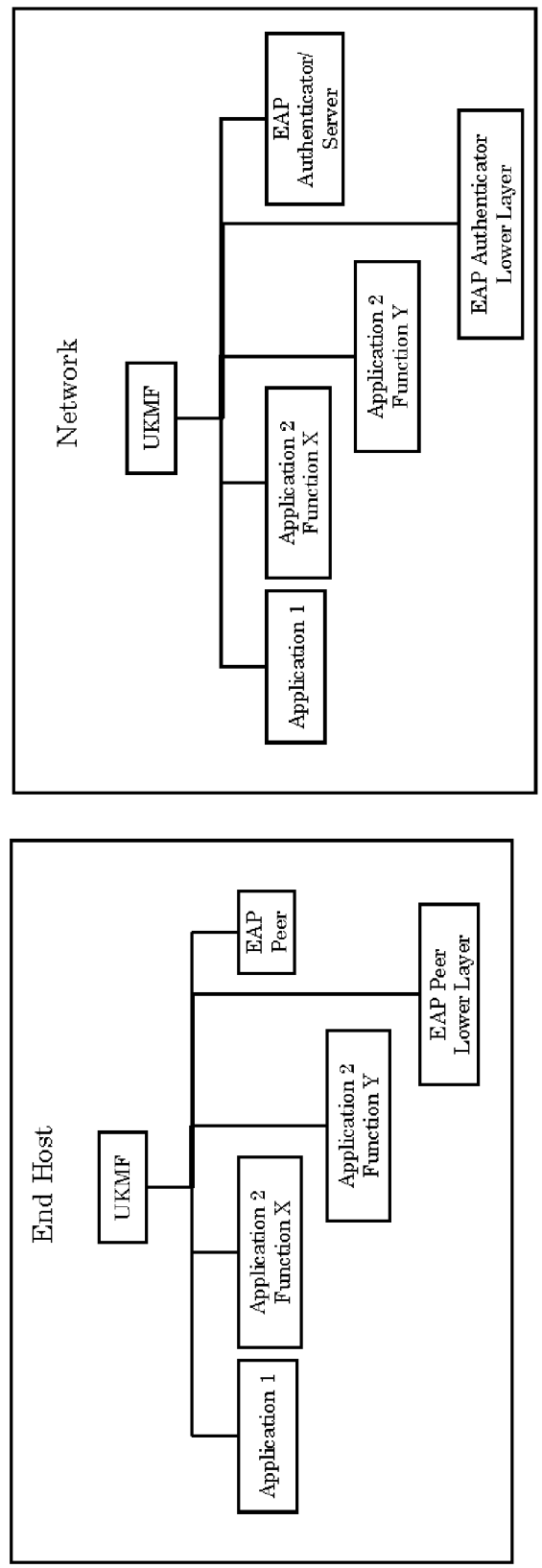
FIG. 2 is a diagram showing a key management mechanism based on EAP key management framework of embodiment.

An example functional composition of a key management system which uses this embodiment is shown in FIG. 2. Here, UKMF is a unified key management function (Unified Key Management Function). Application 1 and Application 2 are applications. Function X and Function Y are application-specific functions of Application 2 where each application-specific function serves for a distinct purpose within the application.

EAP peer is the EAP peer function of [4]. EAP authenticator/server are the function containing both EAP authenticator and EAP server of [4]. EAP Peer lower layer and EAP authenticator lower-layer are the protocol entities of the lower layer of EAP peer and EAP authenticator, respectively. Each functional element in the Network may be implemented on a different node.

Also, an EAP authenticator function and an EAP server function of EAP authenticator/server functional element may be implemented in different nodes.

EAP may be carried out as part of network access authentication or as part of application-level authentication. In the former case, PANA, IEEE 802.1x, PKMv2 or any other EAP transport protocol defined below IP layer may be used. In the latter case, PANA, IKEv2, or any other EAP transport protocol defined at IP layer or above may be used.

UKMF manages EMSK, and for each application, an application master key and purpose-specific key arrays.

Application 1 serves for only one purpose.

Application 2 serves for two purposes, one realized by Function X and the other realized by Function Y.

MSK and EMSK [4] is generated by EAP peer, and EAP server function in EAP authenticator/server, and is held by UKMF. UKMF of the end-host generates from MSK a key or keys to be used by EAP peer lower-layer and the EAP peer lower-layer holds and use the generated key. Similarly, UKMF of the network generates from MSK a key or keys to be used by EAP authenticator lower-layer and the EAP authenticator lower-layer holds and use the generated key. UKMF generates from EMSK an APMK for each of Application 1 and Application 2, and Application 1, Application 2 Function X and Application 2 Function Y hold the generated APMK and generate a purpose-specific key array from APMK using the above-mentioned key derivation algorithm.

The basic sequence for generating and re-keying a purpose-specific key is shown below.

1. Perform EAP authentication between EAP peer and EAP authenticator/server.
2. If EAP authentication succeeds, EAP peer and EAP server will pass MSK and EMSK to their UKMF.
3. End-host UKMF and network UKMF generate an MSK and pass the MSK to EAP peer lower-layer and EAP authenticator lower-layer, respectively. EAP peer lower-layer and EAP authenticator lower-layer use the MSK to bootstrap lower-layer ciphering.
4. Application 1, Application 2 Function X, and Application 2 Function Y of an end-host and a network send and receive the message of Application 1, Application 2 Function X, and Application 2 Function Y between peering entities, respectively, with enabling application ciphering if needed.

When application ciphering is needed but APMK is not acquired yet, they acquire the APMK from their UKMF and generate a purpose-specific key array for a specific purpose of the application and set the effective index of the key array to the initial value (e.g., 0).

When re-key of the purpose-specific key is needed, the effective index is updated, e.g., by incrementing the effective index by one, and the new effective index of the purpose-specific key array is included in an application message, and the application message is enciphered using the purpose-specific key corresponding to the index.

An application message received from a peering node will be discarded, if the index of the purpose-specific key array contained in the message is different from the effective index (i.e., the index that is currently used) for the peering node and is the same as one of those that were used before for the peering node.

Figure 3:
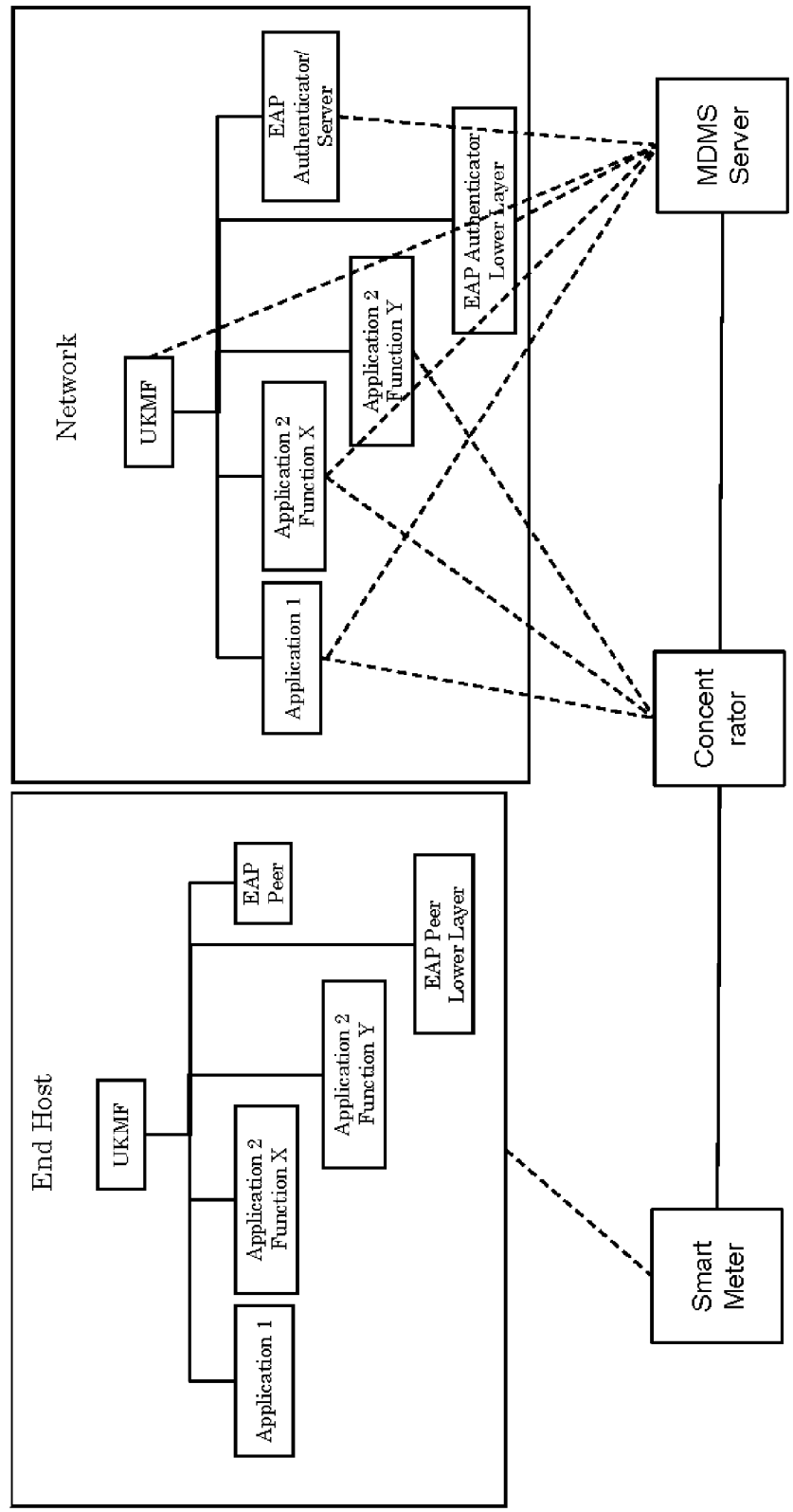
FIG. 3 is a diagram showing a network configuration of embodiment.

Next, an example key management operation using a concrete set of applications is shown in FIG. 3. FIG. 3 consists of smart meter, a concentrator, and MDMS (Meter Data Management System) server. Smart meter provides MDMS server with the amount of the electric power usage through a concentrator (meter reading).

Furthermore, smart meter functions as a client of a Web application in addition to meter reading, and exchanges application data with a Web application server on MDMS server through a concentrator where demand response may be a Web application.

Details of the function of each application are given below.

Application 1 is a Web application, and COAP [5] and HTTP are used as a protocol. Smart meter has a COAP client. Concentrator has a COAP proxy. MDMS server has a HTTP server. A COAP message is exchanged between a COAP client and a COAP proxy. A COAP proxy performs COAP-HTTP protocol conversion between a COAP client and a HTTP server. A COAP message is enciphered between a COAP client and a COAP proxy.

Application 2 is a meter reading application and uses ANSI C12.22 as a protocol. Application 2 has two functions, Function X and Function Y. Application 2 Function X realizes ANSI C12.22 registration service.

In ANSI C12.22 registration service, smart meter is an ANSI C12.22 server and concentrator is an ANSI C12.22 relay, MDMS sever is an ANSI C12.22 master relay and ANSI C12.22 client. ANSI C12.22 relay acts as a forwarder of a registration message between C12.22 server and C12.22 master relay, and a registration message is enciphered between C12.22 server and C12.22 master relay.

Application 2 Function Y is ANSI C12.22 resolve service. In ANSI C12.22 resolve service, smart meter is an ANSI C12.22 server and concentrator is an ANSI C12.22 relay.

In C12.22 resolve service, C12.22 server asks C12.22 relay the transport address of C12.22 client.

An inquiry message is enciphered between C12.22 server and C12.22 relay.

PANA [6] is used as EAP Peer Lower-Layer and EAP Authenticator Lower-Layer. In PANA, smart meter is a PaC (PANA client) and MDMS server is a PAA (PANA authentication agent).

In other embodiments, PAA may reside in other node, for example, in the concentrator or an access point or an access router which are not illustrated in FIG. 3.

Next, example sequences for the operations of the key management mechanism are explained in FIGS. 4 to 8. In FIGS. 4 to 8, an arrow between different nodes expresses the protocol message exchange between nodes, and an arrow inside a functional block expresses information I/O between the functional elements in the same node. Moreover, the number given to the arrow corresponds to a step number of the aforementioned basic sequence for generating and re-keying a purpose-specific key.

The asterisk (*) given to the number shows that the corresponding step is an option.

Figure 4:
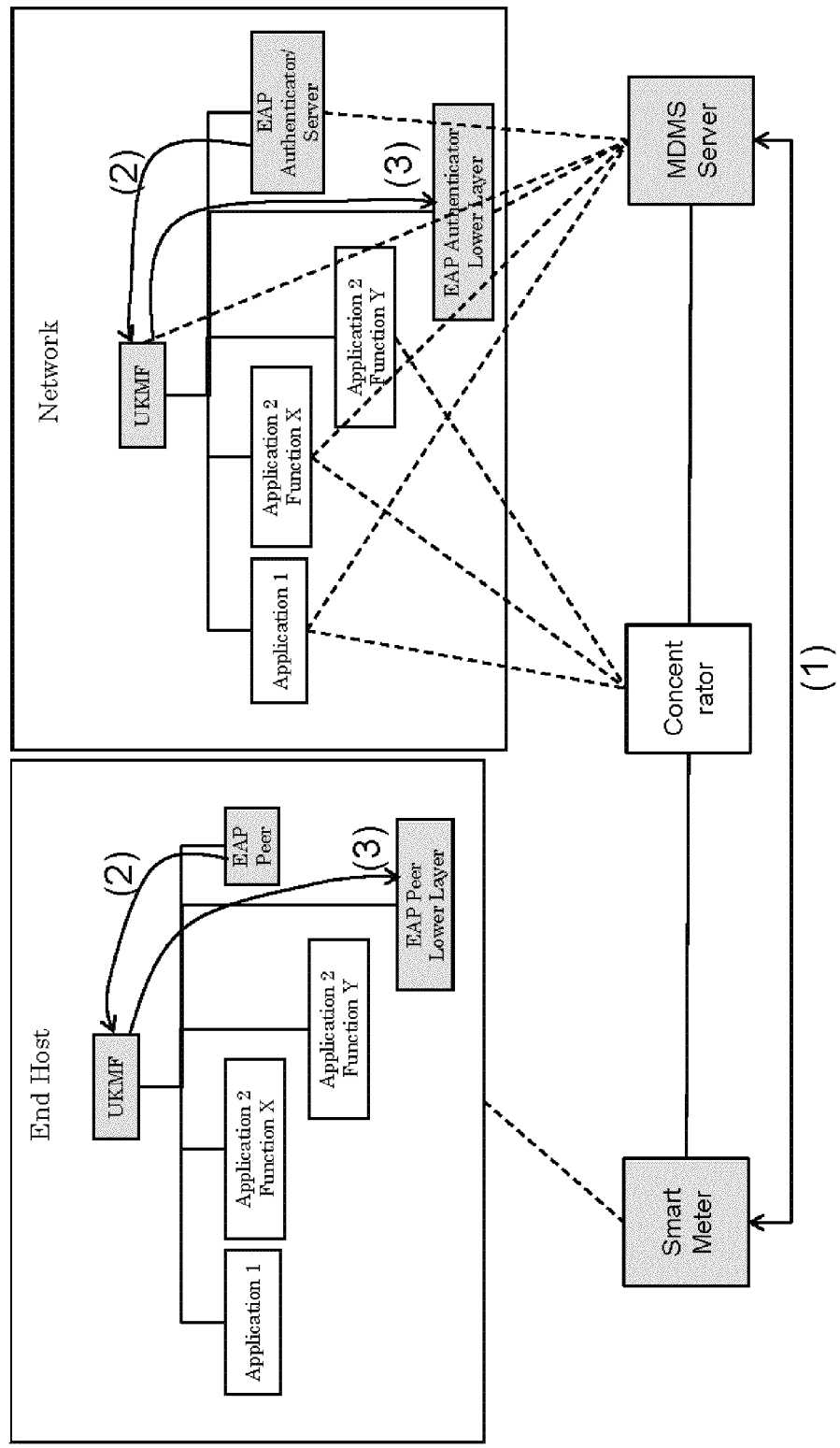
FIG. 4 is a diagram showing a sequence for establishing MSK and EMSK of embodiment.

An example sequence for establishing MSK and EMSK is shown in FIG. 4.

A detailed generation procedure is shown below.

1. Perform EAP authentication between smart meter and MDMS server.
2. If EAP authentication is successful, EAP peer and EAP server will pass MSK and EMSK to each UKMF.
3. Smart meter and MDMS server generate and pass MSK to EAP Peer Lower Layer and EAP Authenticator Lower-Layer, respectively. EAP peer lower-layer and EAP authenticator lower-layer use the MSK to bootstrap lower-layer ciphering.

Figure 5:
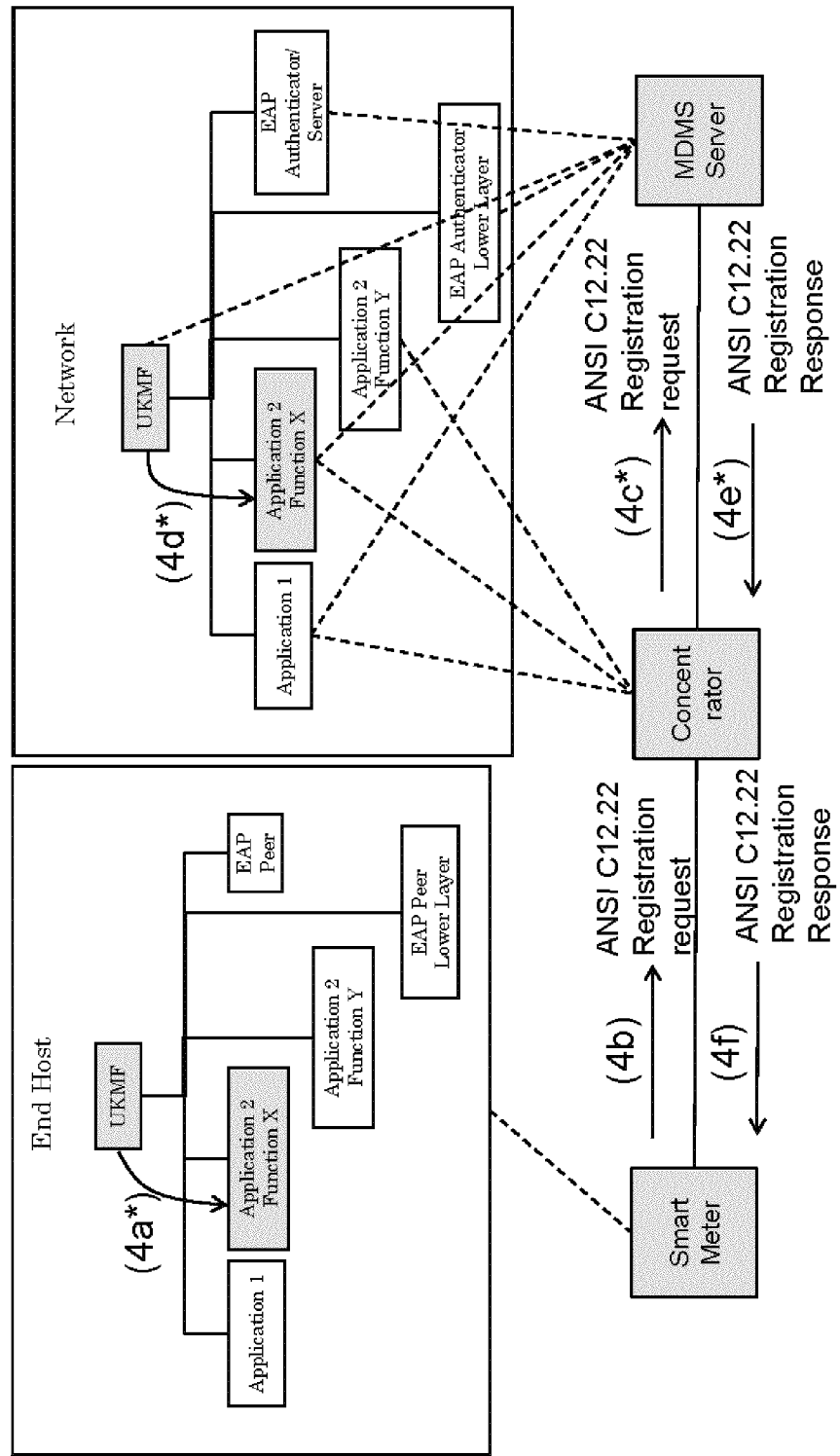
FIG. 5 is a diagram showing a sequence for ANSI C12.22 registration service of embodiment.

An example sequence for ANSI C12.22 registration service is shown in FIG. 5.

A detailed registration procedure is shown below.

4a—If smart meter has not yet acquired APMK, it acquires one from its UKMF and initializes the effective index.

4b—Smart meter transmits an ANSI C12.22 registration request message to concentrator.

4c—Concentrator forwards the ANSI C12.22 registration request message to MDMS server.

4d—If MDMS server does not acquire APMK yet, it acquires from its UKMF, generates a purpose-specific key array from the APMK, initialize the effective index, and decipher the received ANSI C12.22 registration request messages using the purpose-specific key specified by the index carried in the received ANSI C12.22 registration request message.

4e—If deciphering is successful, MDMS server transmits an ANSI C12.22 registration response message to a concentrator.

4f—The concentrator forwards the received ANSI C12.22 registration response message to smart meter.

Figure 6:
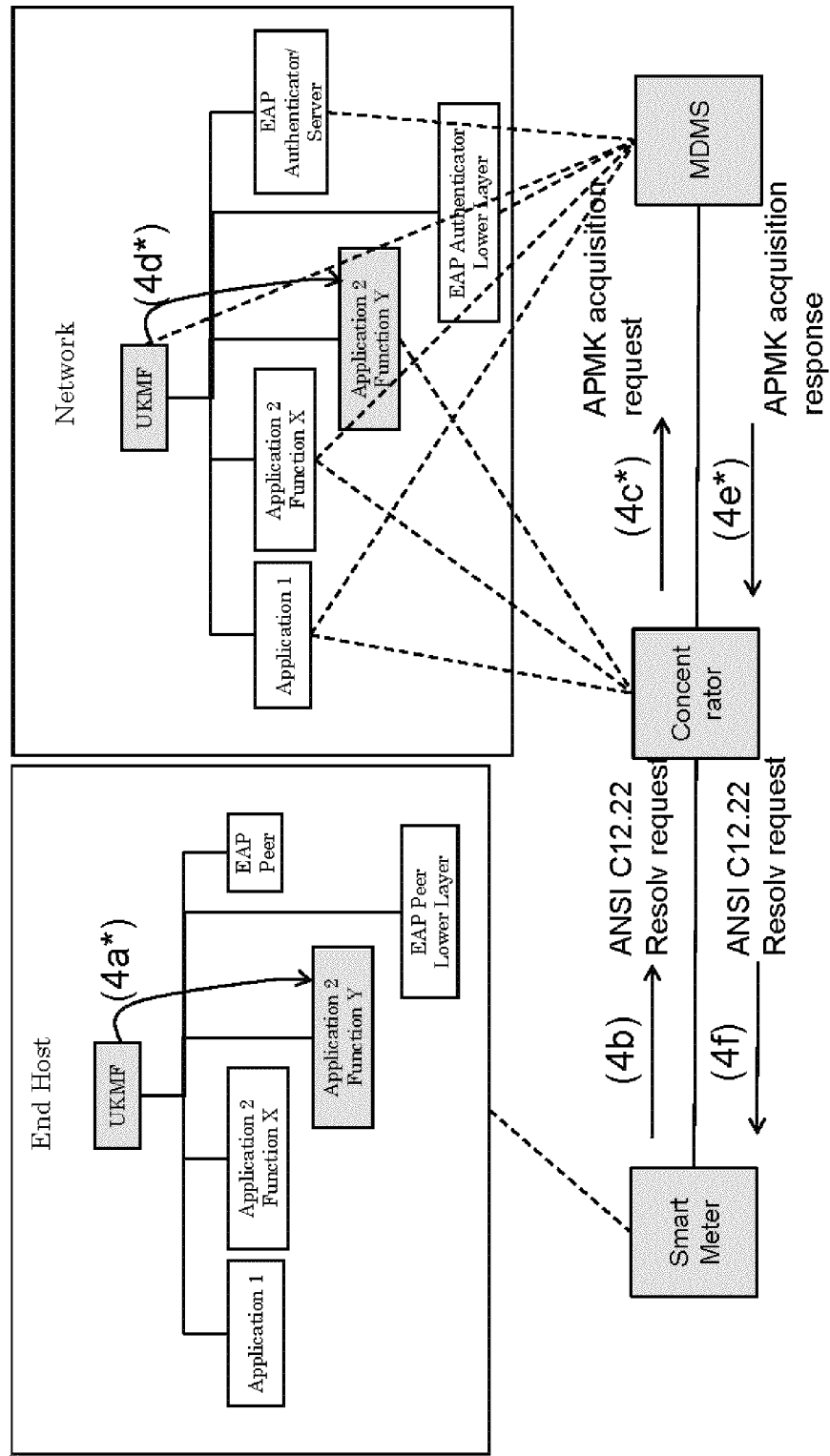
FIG. 6 is a diagram showing a sequence for ANSI C12.22 resolve service of embodiment.

An example sequence for ANSI C12.22 resolve service procedure is shown in FIG. 6.

A detailed resolve procedure is shown below.

4a—If smart meter has not yet acquired APMK, it acquires one from its UKMF and initializes the effective index.

4b—Smart meter transmits an ANSI C12.22 resolve request message to a concentrator.

4c—If the concentrator has not yet acquired APMK, it transmits an APMK acquisition request message to MDMS server to acquire one from MDMS server. The identification information of smart meter and application identification information (key label value of an APMK derivation algorithm) are included in an APMK acquisition request message.

4d—If MDMS server does not acquire APMK yet, it acquires one from its UKMF.

4e—MDMS server transmits the APMK acquisition response message containing an APMK to the concentrator.

4f—Concentrator generates a purpose-specific key array from the APMK and initializes the effective index, and if it succeeds in decoding of an ANSI C12.22 resolve request message using the purpose-specific key specified by the index carried in the received ANSI C12.22 resolve request message, it will transmit an ANSI C12.22 resolve response message to smart meter.

In addition, an APMK request message and an APMK acquisition response message may be defined as ANSI C12.22 acquisition message, and may be defined as a message of other protocols.

Figure 7:
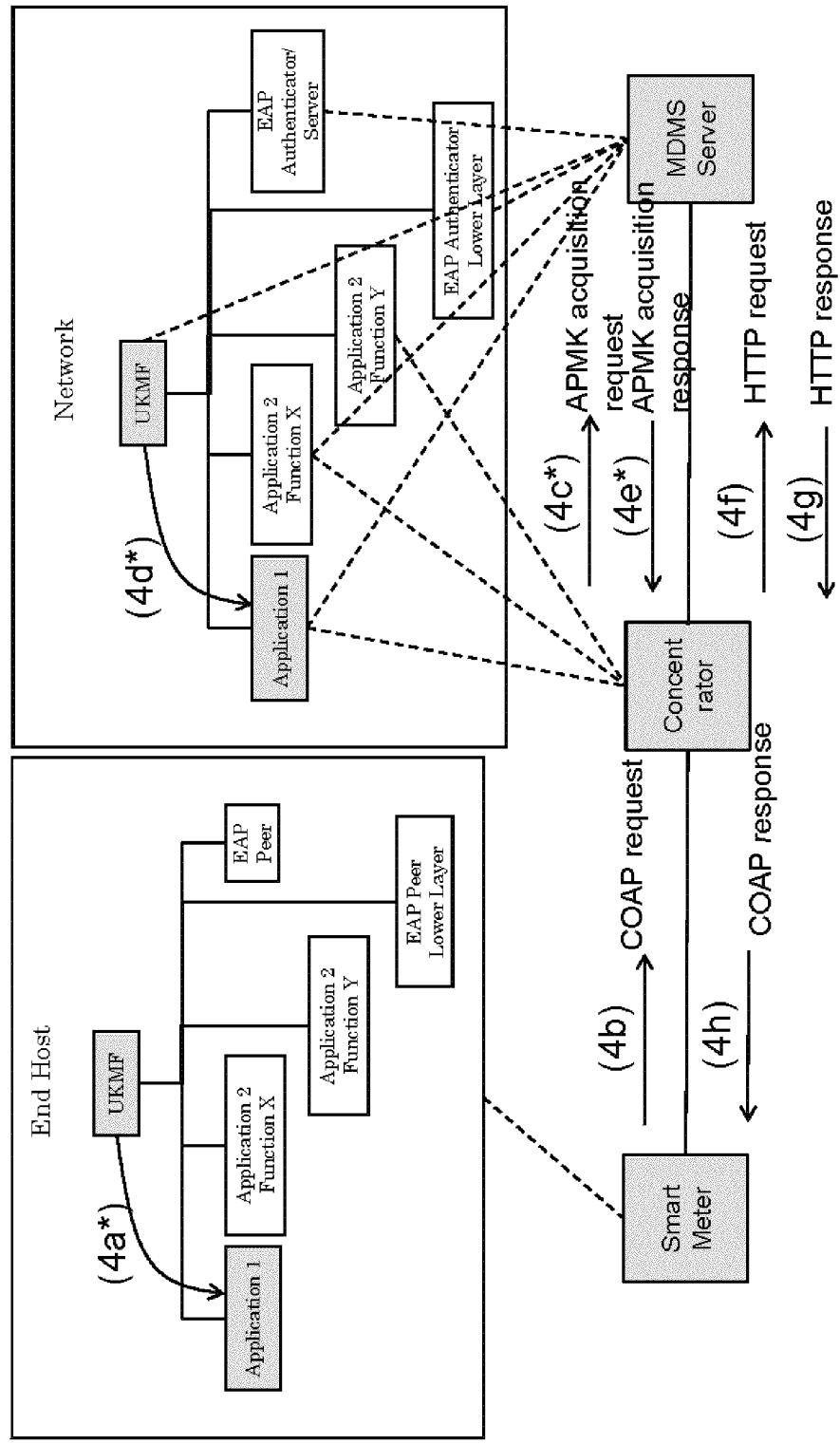
FIG. 7 is a diagram showing a sequence for COAP/HTTP of embodiment.

An example sequence for a COAP/HTTP service procedure is shown in FIG. 7.

A detailed COAP/HTTP service procedure is shown below.

4a—If smart meter does not acquire APMK yet, acquire one from its UKMF and initializes the effective index.

4b—Smart meter transmits a COAP request message to concentrator.

4c—If the concentrator has not yet acquired APMK, it transmits an APMK acquisition request message to MDMS server to acquire one from MDMS server. The identification information of smart meter and application identification information (key label value of an APMK derivation algorithm) are included in the APMK acquisition request message.

4d—If MDMS server does not acquire APMK yet, it acquires one from its UKMF.

4e—MDMS server transmits an APMK response message containing the APMK to concentrator.

4f—Concentrator generates a purpose-specific key array from the APMK and initializes the effective index, and if it succeeds in decoding of a COAP request message using the purpose-specific key specified by the index carried in the received COAP request message, it will transmit a HTTP request message to MDMS server.

4g—MDMS server transmits an HTTP response message to a concentrator.

4h—Concentrator transmits a COAP response message enciphered using the purpose-specific key specified by the index contained in the received COAP request message to smart meter.

In addition, an APMK acquisition request message and an APMK acquisition response message may be defined as an HTTP message, and may be defined as a message of other protocol. In the case of the former, step 4c may be merged with 4f and step 4e may be merged with 4g.

Figure 8:
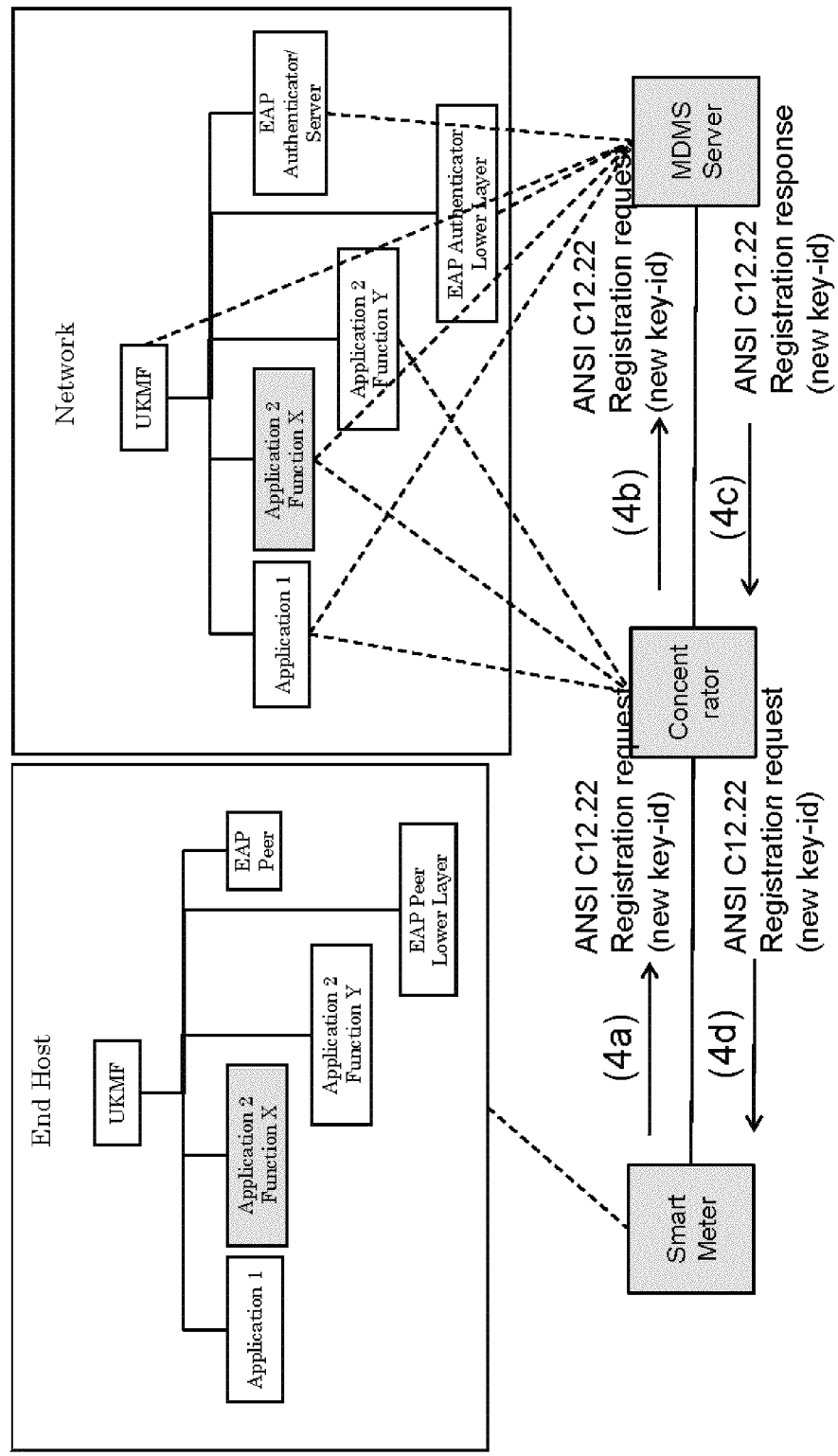
FIG. 8 is a diagram showing a sequence for Rekey of embodiment.

An example sequence for re-key of a purpose-specific key for ANSI C12.22 registration service is shown in FIG. 8.

A detailed re-key procedure is shown below.

Here, smart meter and MDMS server are assumed to already acquire APMK.

4a—Smart meter transmits to a concentrator the ANSI C12.22 registration request message enciphered using a new purpose-specific key array index.

4b—Concentrator forwards the received ANSI C12.22 registration request message to MDMS server.

4c—If MDMS server detects that the usage-specific key array index contained in the received ANSI C12.22 registration request message differs from the effective index, it checks whether this index is one of those were already used in the past for the registrar. If this index is one of those were already used, the received message will be discarded and nothing will be done. Otherwise, if an ANSI C12.22 registration request message is successfully decoded using the purpose-specific key specified by this index, MDMS server replace the effective index with this one, and transmit an ANSI C12.22 registration response message to concentrator.

4d—Concentrator forwards the ANSI C12.22 registration response message to smart meter.

Further Aspects and Embodiments

Further aspects and embodiments of the invention are set forth as follows:

a. Key Management Mechanism

Figure 9:
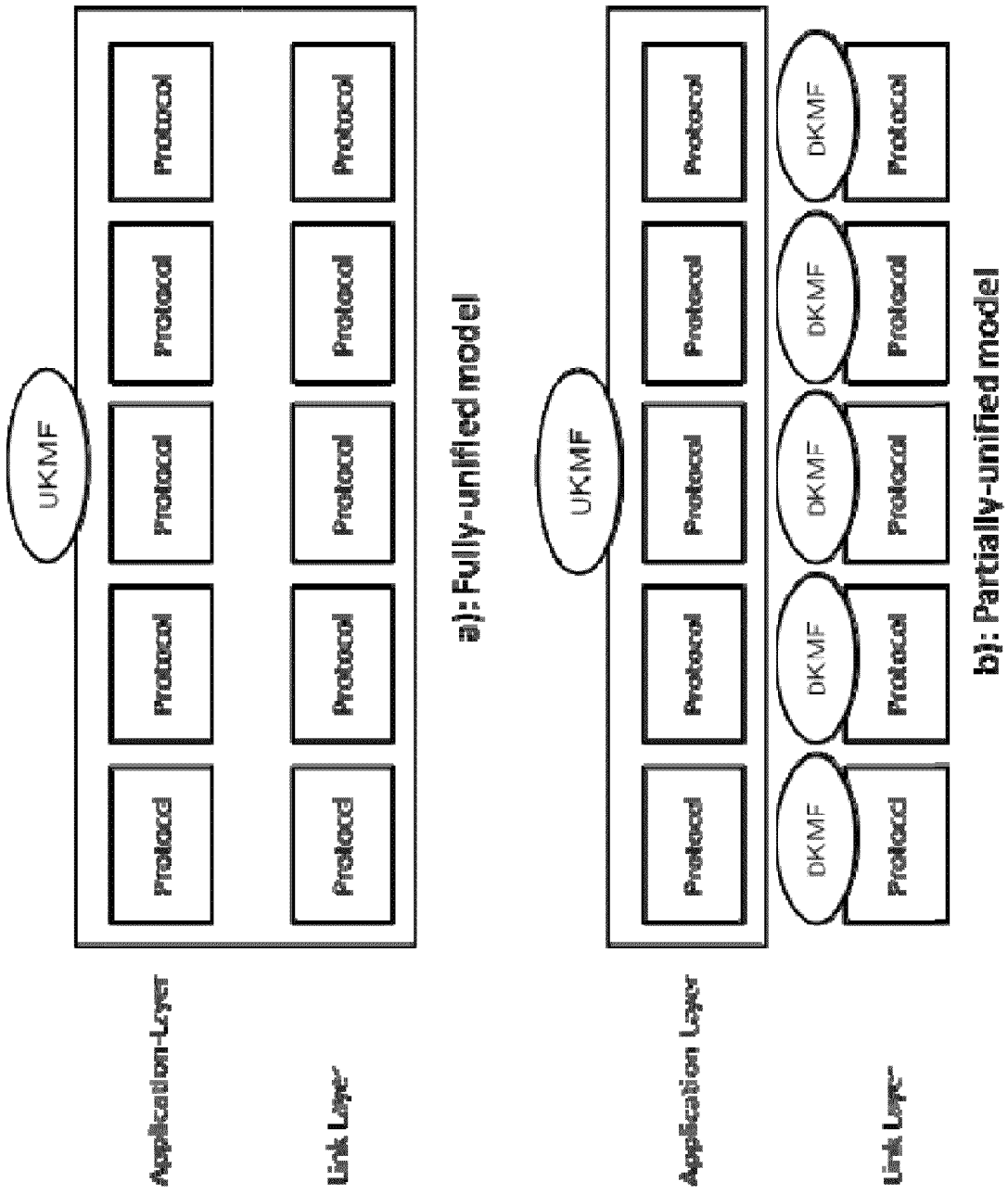
FIG. 9 is a diagram showing an EAP-based fully-unified model and partially-unified model of embodiment.

In some embodiments, the key management mechanism is based on defining a unified key management function (UKMF) across multiple protocols within the same communication layer or across different communication layers. FIG. 9 shows a conceptual model of the scheme. Although FIG. 9 only mentions application-layer and link-layer protocols, this concept is generally applicable to any protocol requiring a cryptographic operation at any communication layer including network layer and transport layer.

Ideally, there is only one UKMF across all protocols with ciphering mechanisms. This is referred to as fully unified model and shown in FIG. 9*a*. On the other hand, depending on deployment requirements and other design constraints some protocol may use a dedicated key management function (DKMF) while others may use a UKMF. This model is referred to as partially unified model. FIG. 9*b* shows a typical instance of partially unified model where only application-layer protocols use a UKMF and link-layer protocols use DKMFs. In general, the mapping between a protocol and a UKMF or a DKMF can be arbitrary in partially unified model. In both fully and partially unified models, a protocol that uses a UKMF may also have a DKMF where the DKMF may be managed by the UKMF, and such a DKMF is not shown in FIG. 9. For example, if some application protocol may have a DKMF based on its own application-specific key management protocol, the UKMF may generate a symmetric key to be used by the application-specific key management protocol to bind the UKMF with the DKMF.

In both fully and partially unified models, the initial peer entity authentication to establish a security association between a pair of UKMFs can be based on either network access authentication or application-level authentication. For example, the initial peer entity authentication can be based on application-level authentication if the access network where a device initially attaches is an open access network.

Although the conceptual model is general enough to be applicable to any key management framework that supports bootstrapping ciphering of multiple protocols, the use of EAP key management framework is considered because it is being used in existing access technologies such as Ethernet, Wi-Fi and Wi-MAX.

Below described are detailed realizations of the key management mechanism based on EAP key management framework [18] as its basis (FIG. 2) to meet all the requirements described above. EAP [4] was originally designed for network access authentication protocol for PPP (Point-to-Point Protocol) and has been adopted by multiple data link layer protocols including IEEE 802.3, IEEE 802.11 and IEEE 802.16 as well as IP and higher layer protocols such as PANA [6] and IKEv2[19]. PANA is being considered for ZigBee SEP2.0 (Smart Energy Profile 2.0)[22]. An authentication algorithm supported by EAP is called an EAP method. EAP supports a number of methods including symmetric and asymmetric key based methods.

EAP with the use of a key generating method exports two types of keys to its lower layer, MSK (Master Session Key) and EMSK (Extensible Master Session Key). Since the MSK usage is to protect the lower layer of EAP, and the end points of a protocol that uses an UKMF may not be the same as those of EAP, the use of EMSK is considered for generating keys especially for AMI applications such as ANSI C12.22[1] and COAP [1], while using MSK mainly for protecting the lower layer of EAP.

Some applications have multiple functions for which communications are carried out between different elements for different functions in the same application. For example, ANSI C12.22 defines a registration function in which a chain of C12.22 relays are responsible for registering an end-host, and a resolve function in which the first hop C12.22 relay from the end host is responsible for resolving the transport address of a communicating peer of the end host. For such an application, a distinct key is generated for and distributed to each network element that is involved in a specific function of the application and communicates with the end host as illustrated in FIG. 2. In FIG. 2, two applications are managed by UKMF, and Application 2 has two functions that use different sets of key material. It is assumed that communications among UKMF and other elements in the end host are realized using local APIs, and communications among UKMF and other elements in the network are realized using either local APIs or protocols depending on whether communicating entities are implemented in the same device or not.

The main task of UKMF in the EAP-based unified key management mechanism is to receive EAP keying material from EAP peer or authenticator/server depending on whether it resides in an end-host or a network, derive key material for, distribute to its key consumers and trigger EAP re-authentication when re-key of MSK and EMSK is needed. In FIG. 2, an element of Application 1, an element of Application 2 Function X, an element of Application 2 Function Y, EAP peer and authenticator lower-layers are the key consumers.

To comply with EAP key management framework [18] which prohibits EMSK to be exported outside the EAP server, UKMF in the network is expected to reside in the same node as the EAP server. The key hierarchy under EMSK is defined in [3] based on USRK (Usage Specific Root Key) as follows:

USRK=KDF(EMSK, key label|"\0"| optional data|length).

In the EAP-based unified key management mechanism, USRK is used for bootstrapping application-layer ciphering key. Cryptographic independency among different application-layer ciphering keys derived from the same EMSK is guaranteed by (i) assigning a unique USRK label for each application, and for an application that has multiple functions, (ii) defining a child key of the application-specific USRK for each function of the application in which each child key is derived using the same USRK derivation algorithm but using its parent key instead of EMSK and a unique label for the function within the application. Additional parameters such as a key identifier and the identifier of the end-host may be contained in the optional data for both USRK and its child keys. The lifetime of any key derived from EAP keying material (i.e., MSK and EMSK) is bounded by the lifetime of the EAP keying material. A derived key may be cached in its key consumer as long as its lifetime remains unexpired.

b. Key Management Mechanism Alternatives

Since there is a number of link-layer technologies used for connecting smart meters to the AMI network such as Ethernet, PLC, ZigBee, Wi-Fi and 3G, considerations are needed for how the EAP-based unified key management scheme can work with different link-layer technologies that may manage link-layer specific keys in different ways. There are two alternative ways.

In the first architectural alternative, EAP is used for both network access authentication and bootstrapping application-layer ciphering where EAP is carried out either at the link-layer using a link-layer specific EAP transport or at the network layer using PANA [6]. There are two cases with regard to link-layer key management using PANA as the EAP transport.

In the first case, link-layer ciphering may be disabled or enabled independently of PANA. In this case, cryptographic or non-cryptographic access control is provided at IP layer or above. An example cryptographic access control is IPsec. An example of non-cryptographic access control is SAVI (Source Address Validation Improvements) [20]. In this case, link-layer ciphering may be enabled using a link-layer specific authentication and key agreement mechanism that may not support EAP, and UMTS AKA is one such mechanism. This case belongs to the partially unified model in that UKMF is part of key management for application-layer ciphering and optionally for IP layer ciphering, but not part of key management for link-layer ciphering.

In the second case, link-layer ciphering is bootstrapped using PANA in which a link-layer master key is securely established between two end-points of the link using the PANA security association, and the link-layer master key is used by the secure association protocol to establish link-layer ciphering keys. The link-layer master key may be an individual key or a group key depending on the trust model of the link layer. When the link-layer master key is an individual key, the key is used solely between the end-points of a particular link. An example of such an individual key is PEMK (PaC-EP Master Key) in [21]. When a group key is used, the trust model provides that all nodes that possess the same group key are considered as trusted. A typical link-layer technology that uses a group key is ZigBee [8]. The group key needs to be securely delivered to each node once it successfully authenticates to the network. PANA may be used for protecting the group key delivery. This case belongs to the fully unified model.

In the second architectural alternative, EAP is used for bootstrapping application-layer ciphering only. PANA is used as the EAP transport for application-level authentication. Note that IKEv2 [19] is another EAP transport over UDP, however, PANA is preferred for smart meters as IKEv2 requires Diffie-Hellman algorithm that can be a burden for hardware constrained devices. Access control at link-layer or network layer may be performed independently of this EAP for bootstrapping application-layer ciphering. This architecture belongs to partially unified model. An example use case of this model is for bootstrapping ANSI C12.22 ciphering keys between ANSI C12.22 host and ANSI 12.22 master relay where the ANSI C12.22 host is a PaC (PANA Client) and the ANSI C12.22 master relay is a PAA (PANA Authentication Agent).

Both architectural alternatives may require an extension of EAP applicability to support application-level authentication to bootstrap application-layer ciphering since the current applicability of EAP is for network access authentication [4]. On the other hand, such an extension of EAP applicability is possible without necessarily requiring a modification of EAP itself. The next subsections describe what additional considerations are needed to extend EAP applicability to fit our unified key management mechanism.

c. Bootstrapping Application-Layering Ciphering

The EAP-based unified key management mechanism requires a mechanism for an end-host to discover information required for bootstrapping application-layer ciphering. The following information needs to be discovered.

The transport identifier of an EAP authenticator that supports bootstrapping application-layer ciphering.

A set of identifiers of applications that support bootstrapping application-layer ciphering from EAP.

For each application that support bootstrapping application-layer ciphering from EAP, the identifier(s) of the application end-point(s) in the network.

d. E-Keying Application-Layer Ciphering Keys

In the EAP-based unified key management mechanism, without an additional re-key mechanism, re-keying application-layer ciphering keys derived from EMSK is carried out via EAP re-authentication. Re-keying EMSK will replace all keys derived from it. Therefore, from optimization point of view, it is desirable to design a system so that frequency of EMSK re-key can be reduced as much as possible. There are three independent solutions to address the re-key issue.

The first solution is to use ERP (EAP Extensions for EAP Re-authentication Protocol) as in [23] for EAP re-authentication. Since ERP operates without re-keying EMSK, this solution can avoid EMSK re-keying even when fully unified model is used and EAP re-authentication for network access happens.

The second solution is to use the second key management alternative (i.e., using EAP carried by PANA for bootstrapping application-layer ciphering only). This solution can avoid EMSK re-key when an end-host changes its network point of attachment since EAP is not used for network access and PANA has its own mobility management mechanism to deal with the end-host's IP address change.

The third solution is to generate multiple sets of application-layer ciphering keys (instead of a single set of application-layer ciphering keys) for each function of a given application and change the effective set of application-layer ciphering keys when re-key is needed. For example, ANSI C12.22 defines an array of ciphering keys where key-id, or the array index, is carried in each security-enabled message, and changing keys is done by changing the key-id value. The size of the key array may be determined based on the characteristics of the application, e.g., the array size for an application may be set such that it is proportional to the average rekey frequency of the application.

e. Exemplary Advanced Metering Infrastructure AMI System Architecture

Figure 10:
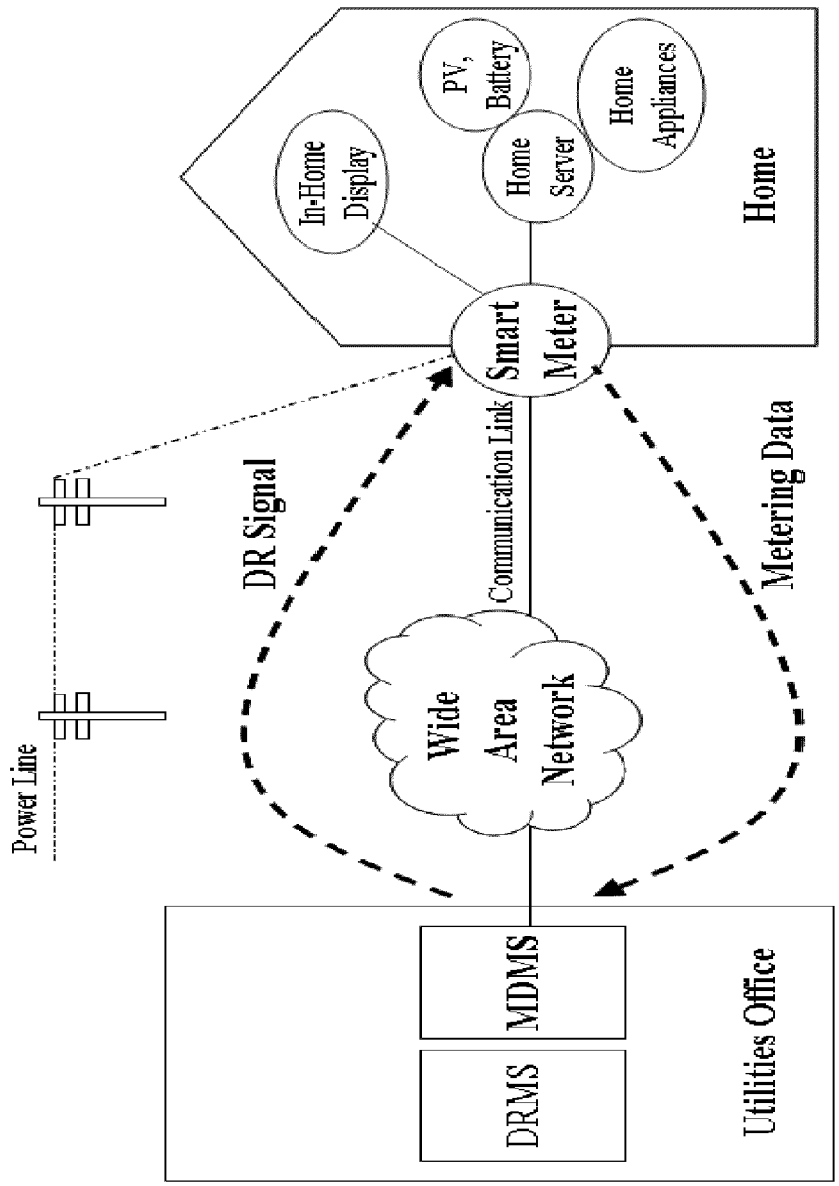
FIG. 10 shows basic components of advanced metering system architecture of embodiment.

FIG. 10 shows the basic components of AMI system. The smart meter installed in the consumer's house pushes the metering data to the Meter Data Management System (MDMS) in the Utilities office; or the MDMS pulls the metering data from the smart meter. And also the smart meter could receive the Demand Response (DR) signal from the MDMS or from the Demand Response Management System (DRMS) via the MDMS. In addition, the smart meter may communicate with the In-Home Display to show the consumer's energy usage and the Home Server to coordinate the energy usage in the home.

Figure 11:
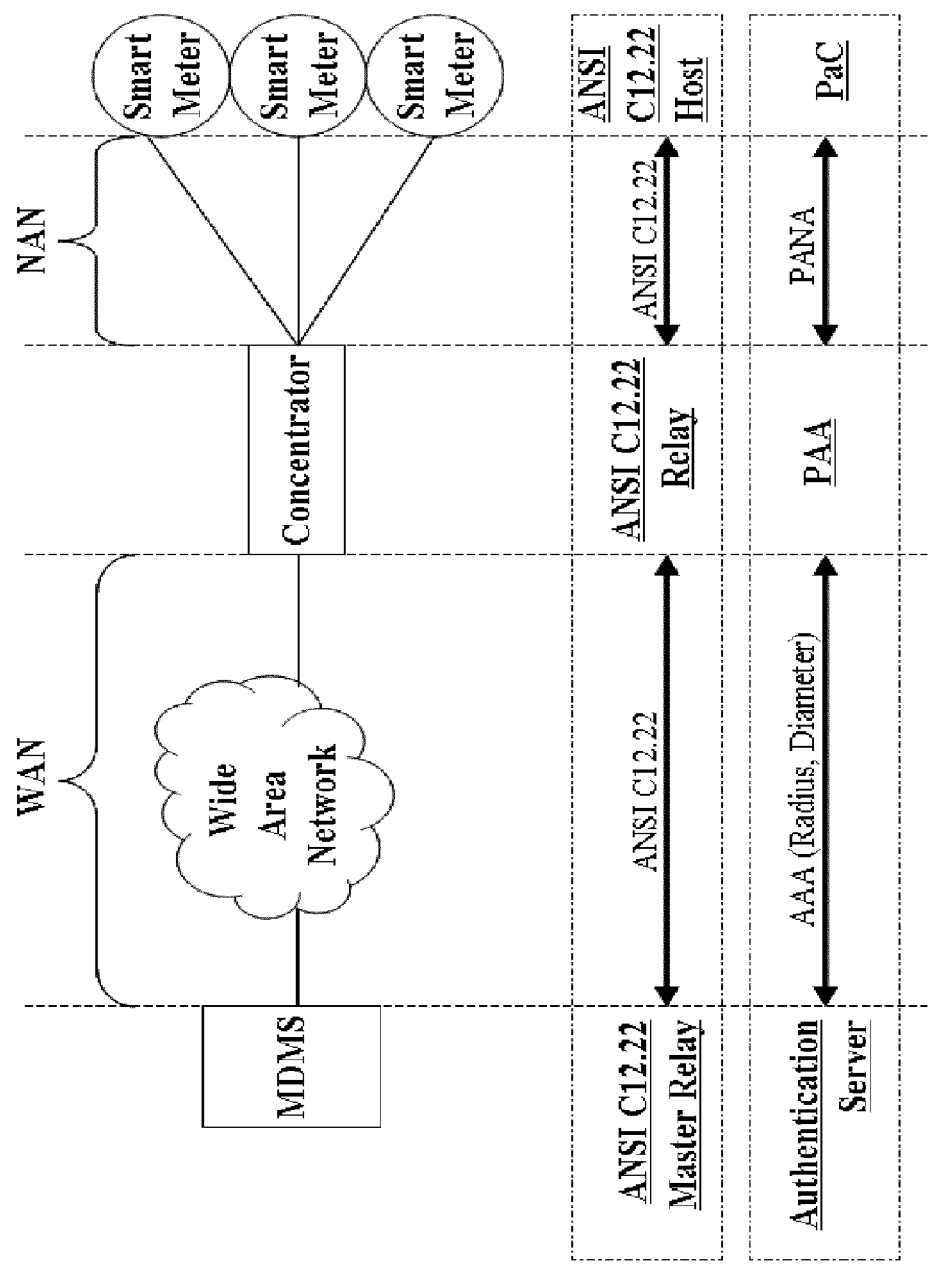
FIG. 11 shows one possible configuration to map a large number of smart meters with utilities office of one possible embodiment.

The smart meter communicates with the MDMS via public Wide Area Network (WAN) which is probably the Internet for the exchange of the DR signal and the Metering Data. ANSI C12.22 is considered here as an application protocol between the MDMS and the smart meter. ANSI C12.22 provides security mechanism but it lacks Dynamic Key Management (Re-Keying) mechanism. In addition, the network access authentication is required in the Neighborhood Area Network (NAN). In order to fulfill these requirements, our unified key management mechanism can be applied as shown in FIG. 11 based on the first architectural alternative as discussed above. Since a large number of smart meters may be attached to one NAN, the data concentrator is installed to collect the metering data. In this case, PANA is used for the network access authentication for the NAN between the concentrator and the smart meter. The concentrator acts as an ANSI C12.22 Relay and PANA PAA, and the smart meter acts as an ANSI C12.22 Host and PANA PaC.

The outline of the authentication and key establishment procedure is shown below:

1. The smart meter starts PANA negotiation with the concentrator at bootstrapping. PANA is used for EAP transport.

2. The concentrator relays the EAP messages between the smart meter and the MDMS. AAA protocol, for example, RADIUS or Diameter is used for EAP transport between the concentrator and the MDMS.

3. The smart meter is permitted to connect the ANSI C12.22 network and the ANSI C12.22 ciphering key is shared by the smart meter, the concentrator, and the MDMS after EAP authentication succeeded. The key is generated from EAP EMSK.

4. When re-key of ANSI C12.22 ciphering key is needed, EAP re-authentication will be carried out as part of PANA re-authentication before expiration of the ANSI C12.22 ciphering key.

On the other hand, a model in which MDMS and smart meters directly communicate without a concentrator can also be considered. This model is referred to as a non-concentrator model. The non-concentrator model is typically used for a NAN with a small number of the smart meters.

The outline of the authentication and key establishment procedure of this model is as follows:

1. The smart meter starts PANA negotiation with the MDMS at bootstrapping. PANA is used for EAP transport.

2. The smart meter shares the ANSI C12.22 ciphering key with the MDMS after EAP authentication succeeds. The key is generated from EAP EMSK.

3. When re-key of ANSI C12.22 ciphering key is needed, EAP re-authentication will be carried out as part of PANA re-authentication before expiration of the ANSI C12.22 ciphering key.

The unified key management mechanism may be implemented as EAP and PANA on an embedded device with Toshiba microprocessor TLCS-900. The footprint of the PANA and EAP implementation may be less than 30 KB which indicates that EAP and EAP lower-layer part of the proposed unified key management mechanism satisfies the requirements described above.

The unified key management mechanism—that can generate ciphering keys for multiple protocols of multiple communication layers from a single peer entity authentication attempt—is suitable for Smart Grid use cases especially for smart metering where smart meters are assumed to be low-cost wireless devices for which repeating peer entity authentication attempts for each protocol can be a burden. The mechanism discussed above is flexible in that the peer entity authentication can be network access authentication or application-level authentication. The details on EAP-based unified key management mechanism considered above show that EAP is widely used for existing link-layer technologies, and it is important to consider re-key efficiency of the ciphering keys bootstrapped from EMSK.

Furthermore, the unified key management mechanism is integrated with an ANSI C12.22 based smart metering application and PANA for network access authentication as well as application-level authentication, with a preliminary implementation result on EAP and PANA on a commercial microprocessor. In future, it maybe that EVs (Electric Vehicles) are considered as a component of Smart Grid.

Broad Scope of the Invention:

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims (e.g., including that to be later added) are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means for "example."

What is claimed is:

1. A rekey method for a communication device, comprising:
   configuring a microprocessor to provide a key control mechanism to derive two or more purpose specific key array from one master key where the purpose specific key in each of the derived purpose specific key array are cryptographically independent of each other;
   using one of the two or more purpose specific key array for one of the two or more specific purposes in an application and using other one of the two or more purpose specific key array for other one of the two or more specific purposes in said same application in such a way so that each of the two or more specific purposes in said same application uses different purpose specific key array; and
   using one purpose specific key array for an application that has only one specific purpose, wherein only one purpose specific key in the key array is effective at same time, and when an effective purpose specific key need to rekey, the key control mechanism stores an array index value corresponding to the effective purpose specific key as used and uses one of unused purpose specific key from the key array as new effective purpose specific key.

2. The method of claim 1, wherein said key control mechanism derives an application master key from one master key for every application, and derives the key array from the application master key.

3. The method of claim 1, wherein the key control mechanism uses purpose specific key that has an index value being equal to the stored array index value plus one as new effective purpose specific key.

4. The method of claim 1, wherein said key control mechanism sets an array size of the key array to a value proportional to frequency of updating the purpose key.

5. The method of claim 1, wherein the key control mechanism determines an array size of the key array by negotiating a use of a control message of the application used the purpose specific key.

6. The method of claim 1, wherein each of application messages includes an array index value corresponding to the purpose specific key used with encryption.

7. The method of claim 6, wherein the key control mechanism informs rekey of an opposite entity, when an effective purpose specific key need to rekey, by an application message including an array index value of a new effective purpose specific key.

8. The method of claim 6, wherein the key control mechanism informs rekey of an opposite entity, when an effective purpose specific key need to rekey, by a control message including an array index value of a new effective purpose specific key.

9. The method of claim 1, wherein: said communication device is a smart meter.

10. The method of claim 9, wherein said smart meter is for metering in relation to use of electric vehicles, home appliances, photovoltaics, rechargeable batteries or other devices.

11. The method of claim 10, wherein said smart meter meters consumption or use information and communicates that information via a communication network back to a provider for monitoring and billing.

12. A communication device configured to receive data from a plurality of metering devices connected to relays distributed in a power grid network, comprising:
   a microprocessor, and
   said microprocessor configured to run a key control mechanism to derive two or more purpose specific key array from one master key where the purpose specific key in each of the derived purpose specific key array are cryptographically independent of each other and using one of the two or more purpose specific key array for one of the two or more specific purposes in an application and using other one of the two or more purpose specific key array for other one of the two or more specific purposes in said same application in such a way so that each of the two or more specific purposes in said same application uses different purpose specific key array; and using one purpose specific key array for an application that has only one specific purpose, wherein only one purpose specific key in the key array is effective at same time, and when an effective purpose specific key need to rekey, the key control mechanism stores an array index value corresponding to the effective purpose specific key as used and uses one of unused purpose specific key from the key array as new effective purpose specific key.

13. The communication device of claim 12, wherein: said device is a meter data management server.

14. The communication device of claim 12, wherein each of said plurality of metering devices is a smart meter for metering in relation to use of electric vehicles, home appliances, photovoltaics, rechargeable batteries or other devices.

* * * * *

UNITED STATES PATENT AND TRADEMARK OFFICE
CERTIFICATE OF CORRECTION

PATENT NO. : 8,886,935 B2
APPLICATION NO. : 13/069989
DATED : November 11, 2014
INVENTOR(S) : Ohba et al.

It is certified that error appears in the above-identified patent and that said Letters Patent is hereby corrected as shown below:

Specification

In Column 1, Line 42, delete "(BANS)." and insert -- (BANs). --, therefor.

In Column 3, Line 64, delete "(RAP)," and insert -- (EAP), --, therefor.

Signed and Sealed this
Eighth Day of March, 2016

Michelle K. Lee
*Director of the United States Patent and Trademark Office*